(12) United States Patent
Nandan et al.

(10) Patent No.: US 11,277,259 B2
(45) Date of Patent: Mar. 15, 2022

(54) MULTI-LAYER ENCRYPTION EMPLOYING KAPREKAR ROUTINE AND LETTER-PROXIMITY-BASED CRYPTOGRAMS

(71) Applicants: Rishab G. Nandan, Chadds Ford, PA (US); Ritvika G. Nandan, Chadds Ford, PA (US)

(72) Inventors: Rishab G. Nandan, Chadds Ford, PA (US); Ritvika G. Nandan, Chadds Ford, PA (US)

( * ) Notice: Subject to any disclaimer, the term of this patent is extended or adjusted under 35 U.S.C. 154(b) by 402 days.

(21) Appl. No.: 16/600,524

(22) Filed: Oct. 13, 2019

(65) Prior Publication Data

US 2020/0059350 A1    Feb. 20, 2020

(51) Int. Cl.
*H04L 9/06*    (2006.01)
*H04L 12/58*   (2006.01)
*H04L 51/18*   (2022.01)

(52) U.S. Cl.
CPC ............ *H04L 9/0618* (2013.01); *H04L 51/18* (2013.01)

(58) Field of Classification Search
CPC .......... H04L 9/0618; H04L 51/18; G09C 1/00
See application file for complete search history.

(56) References Cited

PUBLICATIONS

Zhou, Mi, Jun Steed Huang, and Zhiqiang Zuo. "Investigating Twin Prime Numbers with Mathemagical Twin Black Hole.", 2016, Computational and Applied Mathematics Journal (Year: 2016).*
Sözeri, Volkan, and Urfat Nuriyev. "Graph representation of locked numbers and sequences." In 2012 IV International Conference "Problems of Cybernetics and Informatics" (PCI), pp. 1-4. IEEE, 2012. (Year: 2012).*

* cited by examiner

*Primary Examiner* — Soe Hlaing
(74) *Attorney, Agent, or Firm* — Elman Technology Law, P.C.; Gerry J. Elman

(57) ABSTRACT

Multi-layer computer-implemented methods of encryption and decryption of English-language text messages, as well as practical systems that implement them. The first layer of encryption may be by encoding each character as a 3-digit number, or by letter-proximity-based mapping of characters to unique 1-digit, 2-digit, and 3-digit numbers. A second layer of encryption is achieved by mapping some or all of these numbers to unique cryptograms using patterns from Kaprekar Graphs for 3-digit numbers.

13 Claims, 12 Drawing Sheets

Java code to calculate a Kaprekar Graph

*For (Number = 100; Number <= 999; Number++) {*

*n=parse(Number);*            Break up digits of number
   *sort(n);* Sort the number into ascending and descending order of digits

*Calculate(n);*         Subtract ascending from descending, if 495 return number of steps, if not repeat

KRV is number of steps

| 1 Step | 2 Steps | 3 Steps | 4 Steps | 5 Steps | 6 Steps |
|---|---|---|---|---|---|
| 105 | 106 | 104 | 103 | 102 | 100 |
| 116 | 117 | 107 | 108 | 109 | 101 |
| 126 | 127 | 115 | 114 | 113 | 110 |
| 136 | 137 | 118 | 119 | 120 | 112 |
| 146 | 147 | 125 | 124 | 123 | 121 |
| 150 | 157 | 128 | 129 | 131 | 122 |
| 156 | 160 | 135 | 130 | 132 | 211 |
| 161 | 167 | 138 | 134 | 133 | 212 |
| 162 | 171 | 140 | 139 | 190 | 221 |
| 163 | 172 | 145 | 141 | 200 | 223 |
| 164 | 173 | 148 | 142 | 201 | 232 |
| 165 | 174 | 151 | 143 | 202 | 233 |
| 166 | 175 | 152 | 144 | 209 | 322 |
| 205 | 176 | 153 | 149 | 210 | 323 |
| 216 | 177 | 154 | 159 | 213 | 332 |
| 227 | 206 | 155 | 169 | 220 | 334 |
| 237 | 217 | 158 | 179 | 224 | 343 |
| 247 | 228 | 168 | 180 | 231 | 344 |
| 250 | 238 | 170 | 189 | 234 | 433 |
| 257 | 248 | 178 | 191 | 242 | 434 |
| 261 | 258 | 181 | 192 | 243 | 443 |

FIG. 1

|     | A2 ↓ | A1 ← | B ↓ |     |     |     |
|-----|-----|-----|-----|-----|-----|-----|
| 120 | 220 | 320 | 420 | 520 | 620 | 720 |
| 121 | 221 | 321 | 421 | 521 | 621 | 721 |
| 122 | 222 | 322 | 422 | 522 | 622 | 722 |
| 123 | 223 | 323 | 423 | 523 | 623 | 723 |
| 124 | 224 | 324 | 424 | 524 | 624 | 724 |
| 125 | 225 | 325 | 425 | 525 | 625 | 725 |
| 126 | 226 | 326 | 426 | 526 | 626 | 726 |
| 127 | 227 | 327 | 427 | 527 | 627 | 727 |
| 128 | 228 | 328 | 428 | 528 | 628 | 728 |
| 129 | 229 | 329 | 429 | 529 | 629 | 729 |
| 130 | 230 | 330 | 430 | 530 | 630 | 730 |
| 131 | 231 | 331 | 431 | 531 | 631 | 731 |
| 132 | 232 | 332 | 432 | 532 | 632 | 732 |
| 133 | 233 | 333 | 433 | 533 | 633 | 733 |
| 134 | 234 | 334 | 434 | 534 | 634 | 734 |
| 135 | 235 | 335 | 435 | 535 | 635 | 735 |
| 136 | 236 | 336 | 436 | 536 | 636 | 736 |
| 137 | 237 | 337 | 437 | 537 | 637 | 737 |

FIG. 2B

| PLAINTEXT | NUMERICAL CRYPTOGRAM |
|---|---|
| A | 180 |
| B | 1 |
| C | 2 |
| D | 25 |
| E | 290 |
| F | 3 |
| G | 4 |
| H | 87 |
| I | 480 |
| J | 5 |
| K | 6 |
| L | 580 |
| M | 590 |
| N | 85 |
| O | 680 |
| P | 7 |
| Q | 8 |
| R | 780 |
| S | 86 |
| T | 81 |
| U | 880 |
| V | 9 |
| W | 82 |
| X | 84 |
| Y | 83 |
| Z | 97 |
| 1 | -a- |
| 2 | -b- |
| 3 | -c- |
| 4 | -d- |
| 5 | -e- |
| 6 | -f- |
| 7 | -g- |
| 8 | -h- |
| 9 | -i- |
| 0 | -j- |
| ? | ? |
| , | , |
| . | . |
| : | : |
| [space] | -0- |

FIG. 4

Sample Matlab code for Encryption

- clc; clear all; close all;

-

- % First Map (Note: In this iteration, uppercase and lowercase letters are assigned the same numbers to demonstrate the encoding and decoding of text, since case sensitivity is not needed to comprehend the decoded message.)
- key = {'A','a','B','b','C','c','D','d', 'E','e', 'F','f', 'G', 'g', 'H','h','I','i', 'J','j','K','k','L', 'l','M', 'm','N', 'n', 'O', 'o', 'P','p', 'Q', 'q','R', 'r','S', 's', 'T', 't','U', 'u','V', 'v','W', 'w','X', 'x','Y', 'y','Z', 'z',' ','.',',',';',':','?','-','"','1','2','3','4','5','6','7','8','9','0'};
- val = {'180','180','1','1','2','2','25','25', '290','290', '3','3','4','4','87','87','480','480','5','5','6','6','580','580','590','590','85','85','680','680','7','7','8','8','780','780','86','86','81','81','880','880','9','9','82','82','84','84','83','83','97','97','-0-',' ','.',',',';',':','?','-','"','a','b','c','d','e','f','g','h','i','j'};
- M1= containers.Map(key,val);

-

- % Second Map (where 3 digit numbers are encoded using Kaprekar map)
- keySet1 = val;
- valueSet1 = {'K7R6U3','K7R6U3', '1','1','2','2','25','25', 'K8R6U2', 'K8R6U2','3','3','4','4','87','87','K7R3U3','K7R3U3', '5','5','6','6','K7R2U3','K7R2U3','K8R3U2','K8R3U2','85', '85','K7R1U3', 'K7R1U3','7','7','8','8', 'K7R0U3', 'K7R0U3', '86','86', '81','81', 'K7L1U3','K7L1U3', '9', '9','82','82', '84','84', '83','83', '97','97','-0-',' ','.',',',';',':','?',
- '-','"','-a-','-b-','-c-','-d-','-e-','-f-','-g-','-h-','-i-','-j-'};
- M2 = containers.Map(keySet1,valueSet1);
- % Initialize the encoded string
- encodedStr2='';
- encodedStr1='';
- for i=1:length(text)
-   M11=M1(text(i));
- encodedStr1 = strcat(encodedStr1, M1(text(i)));
-   encodedStr2 = strcat(encodedStr2, M2(M11))
- end © 2019 Rishab & Ritvika Nandan

FIG. 6A

Sample Matlab code for Decryption

- %Below is the decryption/decoding routine
- %text1 = encodedStr2;
- 
- %encodedStr3='';
- %encodedStr4='';
- decoded1 = encodedStr2
- 
- decoded1 = regexprep(encodedStr2,{'K7R6U3','K8R6U2','K7R3U3','K7R2U3','K8R3U2','K7R1U3','K7R0U3', 'K7L1U3' , '-0-'},{'a','e','i','l', 'm','o','r','u',' '})
- decoded2 = regexprep(decoded1,{'25','87','85','86', '81','82','84','83', '97','-0-'},{'d', 'h','n', 's','t', 'w', 'x', 'y', 'z',' '})
- decoded3 = regexprep(decoded2,{'1','2','3','4','5','6','7','8','9','-0-'},{'b','c','f','g','j','k', 'p', 'q', 'v', ' '})
- decoded4 = regexprep(decoded3,{'-a-','-b-','-c-', '-d-',
- '-e-', '-f-', '-g-', '-h-', '-i-', '-j-'},{'1','2','3','4','5','6','7','8','9','0';})
- decoded5 = decoded4;
- for len = 1:length(decoded4)
-     decoded5(1) = upper(decoded4(1));
-     if decoded4(len) == ' ',
-        decoded5(len+1) = upper(decoded4(len+1));
-     end
- end
- decoded5

© 2019 Rishab & Ritvika Nandan

FIG. 6B

Sample Text for Encryption

On Wednesday the 19th, the Supreme Court once again took on a question that has long confounded it: What qualifies as an impermissible establishment of religion under the Constitution?

1$^{st}$ Level Encryption

68085-0-822902585290862518083-0-8187290-0-ai8187,-0-8187290-0-868807780290590290-0-268088078081-0-680852290-0-180418048085-0-816806806-0-68085-0-180-0-8880290868148068085-0-818718081-0-8718086-0-580680854-0-268085368080852529025-0-48081:-0-828718081-0-888018058048034802908 6-0-18086-0-18085-0-480590729078059048086864801580290-0-29086811801580480 86875902908581-0-6803-0-78029058048044806808 5-0-8808525290780-0-8187290-0-268085868148081880814806808 5?

2nd Level Encryption

K7R1U385-0-82K8R6U22585K8R6U28625K7R6U383-0-8187K8R6U2-0--a--i-8187,-0-8187K8R6U2-0-86K7L1U37K7R0U3K8R6U2K8R3U2K8R6U2-0-2K7R1U3K7L1U3K7R0U381-0-K7R1U3852K8R6U2-0-K7R6U34K7R6U3K7R3U385-0-81K7R1U3K7R1U36-0-K7R1U385-0-K7R6U3-0-8K7L1U3K8R6U28681K7R3U3K7R1U385-0-8187K7R6U381-0-87K7R6U386-0-K7R2U3K7R1U3854-0-2K7R1U3853K7R1U3K7L1U38525K8R6U225-0-K7R3U381:-0-8287K7R6U381-0-8K7L1U3K7R6U3K7R2U3K7R3U33K7R3U3K8R6U286-0-K7R6U386-0-
K7R6U385-0-
K7R3U3K8R3U27K8R6U2K7R0U3K8R3U2K7R3U38686K7R3U31K7R2U3K8R6U
2-0-K8R6U28681K7R6U31K7R2U3K7R3U38687K8R3U2K8R6U28581-0-
K7R1U33-0-K7R0U3K8R6U2K7R2U3K7R3U34K7R3U3K7R1U385-0-
K7L1U38525K8R6U2K7R0U3-0-8187K8R6U2-0-
2K7R1U3858681K7R3U381K7L1U381K7R3U3K7R1U385?

Decrypted Text

On Wednesday The 19th, The Supreme Court Once Again Took On A Question That Has Long Confounded It: What Qualifies As An Impermissible Establishment Of Religion Under The Constitution?

FIG. 7B

MULTI-LAYER ENCRYPTION EMPLOYING KAPREKAR ROUTINE AND LETTER-PROXIMITY-BASED CRYPTOGRAMS

CROSS-REFERENCE TO RELATED APPLICATIONS

None.

COPYRIGHT AUTHORIZATION STATEMENT

A portion of the disclosure of this patent document contains material which is subject to copyright protection. The copyright owners have no objection to the facsimile reproduction by anyone of the patent document or the patent disclosure, as it appears in the Patent and Trademark Office patent file or records, but otherwise reserve all copyright rights whatsoever.

BACKGROUND OF THE INVENTION

The present invention relates generally to encrypted message communication, and more specifically to communication of message data via a network from a sender computer to a receiver computer, using encryption to protect the message data.

Transmitting information so that only the intended recipients could understand it is an ancient art. Numerous systems and methods have been developed over hundreds, if not thousands of years. The relatively recent rise of computer and long-distance electronic transmission made the art more urgent while completely upending it. Old, well-loved methods have been cracked, and new methods need to be devised. The encryption arms race continues at full pace, as methods are being cracked continuously. Data security, especially in the context of widespread social media use, is key to transmitting information safely and preventing it from being exploited or misused by our adversaries.

SUMMARY OF THE INVENTION

The invention provides multi-layer computer-implemented methods of encryption and decryption of English-language text messages, as well as practical systems that implement such methods. The first layer of encryption of a data file may be achieved by encoding each character as a 3-digit number, or preferably by clever letter-proximity-based mapping of characters to unique 1-digit, 2-digit, and 3-digit numbers, while avoiding ambiguity when they occur in groups. The second layer of encryption is achieved by encoding some or all of these numbers as unique sets of characters developed from maps generated using the concept of Kaprekar Constant for 3-digit numbers, referred to in this document as Kaprekar Graphs for 3-digit numbers.

The present invention can be implemented as a stand-alone data encryption tool or it can be added as an additional layer of encryption for enhanced security. This invention uses a method which is simple to implement but very difficult to decrypt without very specific information about the encryption method.

Mathematician D. R. Kaprekar discovered that 3-digit numbers all produce the number 495 in 6 or fewer steps when the digits of the number are rearranged in ascending and descending order and subtracted, recursively. In the present invention, this interesting fact is exploited to provide a method that adds additional layers of robustness to data security to protect information. Based on the predictable pattern generated by the arrangement of natural numbers in the Kaprekar map, we developed an encryption scheme to hide messages and make data more secure.

In the simplest implementation of our invention, a 3-digit number is assigned to each letter character. A Kaprekar Graph is used to encode the numbers into Kaprekar Cryptograms. Since only the sender and receiver will have the key—a Kaprekar Graph and the path chosen on the map to encrypt each 3-digit number—the message is secure.

In another implementation, letters are encoded into 1-digit, 2-digit, and 3-digit numbers in a manner that avoids ambiguity about decoding them when they occur together in words. We have developed an enhanced multi-layer encryption scheme by augmenting such letter-proximity-based mapping with encryption using mathematical patterns developed from the Kaprekar Constant.

In accordance with certain preferred embodiments of the invention, each character of a text message is encoded as a base-10 number between 1 and 999. In these embodiments, uncommon letters such as Q and Z are encoded as single-digit numbers, while more common letters like E and S are encoded as 3-digit numbers. Each character represented by a 3-digit number is further encrypted as a Kaprekar Cryptogram. In these embodiments, the Ciphertext output is a string of characters (e.g. binary-coded-decimal characters) comprising 1-digit numbers, 2-digit numbers, and Kaprekar Cryptograms.

In certain embodiments where the text message includes numerals, each numerical digit in the Plaintext message is encoded as a letter flanked by special characters from the array [$ # @ % ! ^ & * ( ) _ - += : ; "' < >, . ? / \ | { }[ ] ~ ']. For example, 1 may be encoded as -a-. Similarly, a word delimiter, or "space" character, may be encoded as -0-. Also, a number is desirably encoded as one or more alphabetic characters, optionally along with any non-numeric characters chosen.

In certain embodiments, punctuation and other non-alphanumeric characters (referred to as "special characters" in this patent disclosure) such as any of the characters of the array [$ # @ % ! ^ & * ( ) _ - += : ; "' < >, . ? / \ | { }[ ] ~ '] are either not encoded, or else may be represented by other special characters, optionally also flanked by special characters such as hyphens.

In certain other embodiments, all characters are encoded as 3-digit numbers, and then transformed into Kaprekar Cryptograms.

In certain embodiments, to provide another layer of encryption, the Ciphertext output generated as described above is further encoded by substituting $Kaprekar^2$ Cryptograms for at least some of the 3-digit sequences appearing in such Ciphertext.

The generation of Kaprekar Cryptograms is a feature of the present invention. In accordance with the invention, a representation of a Kaprekar Graph is created in a computer memory. In embodiments of the invention employing 3-digit numbers (expressed in base 10 and typically represented in computer memory as binary-coded decimal) to encode some or all of the characters in a message, the graph contains representations of each of the 3-digit numbers 100 to 999, arranged in 90 rows by 10 columns.

In the aforesaid embodiments, each node contains one of these 3-digit numbers, and the numbers proceed in sequential order from 100 to 999. The nodes are connected by edges, and each node is connected directly to 2 to 4 other nodes. All of the nodes are connected indirectly. The edges connect the nodes to create a data structure that may be depicted as a rectangular, two-dimensional map, as in FIGS. 2A and 2B. This patent specification calls such a graph a "Kaprekar Graph."

Each node in the graph may also be coded for how many rounds of the Kaprekar routine would be needed to reach the Kaprekar Constant 495, starting from the numerical value of the node. We call this the Kaprekar Routine Value ("KRV"). For 3-digit numbers, the range of KRVs are the integers from 0 to 6. The KRV for Node 495 is 0, as are the KRVs for the "epicenters", the nodes numbered 111, 222, 333, 444, 555, 666, 777, 888, and 999. See FIG. 2A for a visual representation.

The present invention employs Kaprekar Cryptograms, which are based on assigning a "path" for each 3-digit number to reach key "landmarks" in the Kaprekar Graph called epicenters. For example: "go left, then vertically" from a point on the map representing a 3-digit number to a particular epicenter. That is, the path, defined by a pair of orthogonal vectors, used to encrypt each 3-digit number representing a character in the original message text.

Starting at the node representing the 3-digit number obtained from the first level of encryption, the system would evaluate the number of nodes to the left or right on the map of a Kaprekar Graph until directly above or below a particular epicenter, then find the number of steps up or down to get to the epicenter. The corresponding Kaprekar Cryptogram could have the format: K_L_D_, or K_R_D_or K_L_U_or K_R_U_where K is the specific epicenter, and L or R and D or U stand for "left or right" and "down or up" respectively. To change the encryption key, one would simply change the path, e.g. to right rather than left to any of the many epicenters via multiple paths using a combination of Left/Right and Up/Down steps.

Note the following interesting characteristics of the Kaprekar Graph:
- 3-digit numbers that are different, but have the same digits, will have the same number of steps to reach 495, that is, the KRV. For example, the numbers 924, 294, 429, and 942 all take 3 steps to get to 495.
- On a visual representation of the Kaprekar Graph such as FIG. 2A, there are repeating symmetric oval patterns that appear to be moving diagonally across the grid.
- The 6-step numbers form a ring around the numbers that don't get to 495 (non Kaprekar numbers such as 111, 222, 333, etc., called "epicenters")
- Surrounding the 6-step numbers are the 5-step numbers, followed by 4-step numbers, 3-step numbers, 1-step numbers and finally 2-step numbers.

In accordance with certain embodiments of the invention, each character of a text message is encoded as a base-10 number between 100 and 999. Each of the 3-digit numbers is further encrypted using the Kaprekar Graph, whereby each 3-digit number is converted to a "Kaprekar Cryptogram" as aforesaid. Each Kaprekar Cryptogram represents the direction and distance on the Kaprekar Graph between that 3-digit number and an epicenter. The stream of successive Kaprekar Cryptograms, a combination of the numbers and directions, is the Ciphertext output of the process of this embodiment of the invention.

In a first multi-layer embodiment, the first layer of encryption is a letter-proximity-based encoding where each character of the text, in particular, alphabet letters of the text (and optionally numbers and punctuation), are encoded as a value that may be represented (in base 10) as a 1-digit, 2-digit or 3-digit number. The numerical cryptograms (i.e. numerical codes for particular letters) are chosen taking into account their likelihood of adjacency in English-language text. For an example, see FIG. 4. For each character encoded as a 3-digit number, a further layer of encryption is provided by substituting a Kaprekar Cryptogram for the 3-digit number. The resulting Ciphertext is a string of characters comprising 1-digit numbers, 2-digit numbers, and Kaprekar Cryptograms.

In a second multi-layer embodiment of the invention, a processor parses Ciphertext produced as described in the previous paragraph, scanning for instances where a 1-digit number adjoins a 2-digit number or a pair of 1-digit numbers. In those instances, the processor substitutes a Kaprekar Cryptogram for the 3-digit number in what was the Ciphertext output. Each Kaprekar Cryptogram generated at this (second) level is coded so as to be distinguishable from all of the Kaprekar Cryptograms generated at the first level. We will refer to such further-enciphered Ciphertext output as Kaprekar$^2$ Ciphertext, or Kaprekar-squared Ciphertext, or second-level Kaprekar Ciphertext, which are alternative designations for the same thing.

Ciphertext is also known as encrypted information because it contains a form of the original Plaintext that is unreadable by a human or computer without the proper cipher to decrypt it. Decryption, the inverse of encryption, is the process of turning Ciphertext into readable Plaintext.

To decrypt Ciphertext encrypted in accordance with our invention, the recipient system must include two things:

Firstly, the recipient system would have a table in computer memory providing the relationship between each of the encoded numbers and the characters they represent. In one of the embodiments described above, each of the encoded numbers is a 3-digit number expressed in base 10. In another embodiment, various of the numerical cryptograms corresponding to characters in the original message Plaintext may be a 1-digit number, a 2-digit number, or a 3-digit number.

Secondly, the recipient system would have a data structure in memory embodying a version of the Kaprekar Graph that encoded the various 3-digit numbers into Kaprekar Cryptograms. The recipient system would include a processor programmed to decode each Kaprekar Cryptogram containing directions from the node to an epicenter, returning as output a decryption value, either each of the 3-digit numbers or preferably, each of the Plaintext characters corresponding to such 3-digit numbers.

In some embodiments, one epicenter is repeatedly used to encrypt a particular 3-digit number throughout the entire Ciphertext for a given message encoded during a particular encryption session. In other embodiments, different epicenters are randomly or selectively used to produce different Kaprekar Cryptograms for a given 3-digit number that corresponds to a particular letter or other character within the text.

BRIEF DESCRIPTION OF THE DRAWINGS

FIG. 1 is a program in Java that calculates the Kaprekar Routine Value for a given numerical input and a table of results.

FIG. 2B shows a portion of a Kaprekar Graph with vectors illustrating how Kaprekar Cryptograms for a particular node, e.g. 320, may be generated.

FIG. 4 is a table showing an example of conversion of characters (here, letters, numbers, and punctuation) of Plaintext to numerical cryptograms having 1, 2 or 3 digits chosen by letter-proximity-based mapping.

FIG. 6A is a sample program in Matlab code for encrypting text in accordance with an embodiment of the invention FIG. 6B is a sample program in Matlab code for decrypting Ciphertext produced by the Matlab code shown in FIG. 6A.

FIG. 7A shows sample text for encryption and the results of $1^{st}$ level encryption by the Matlab code shown in FIG. 6A.

FIG. 7B shows the results of $2^{nd}$ level encryption by the Matlab code shown in FIG. 6A of the sample text shown in FIG. 7A and the result of decryption of the sample by the Matlab code shown in FIG. 6B.

DETAILED DESCRIPTION

Figure 2A:
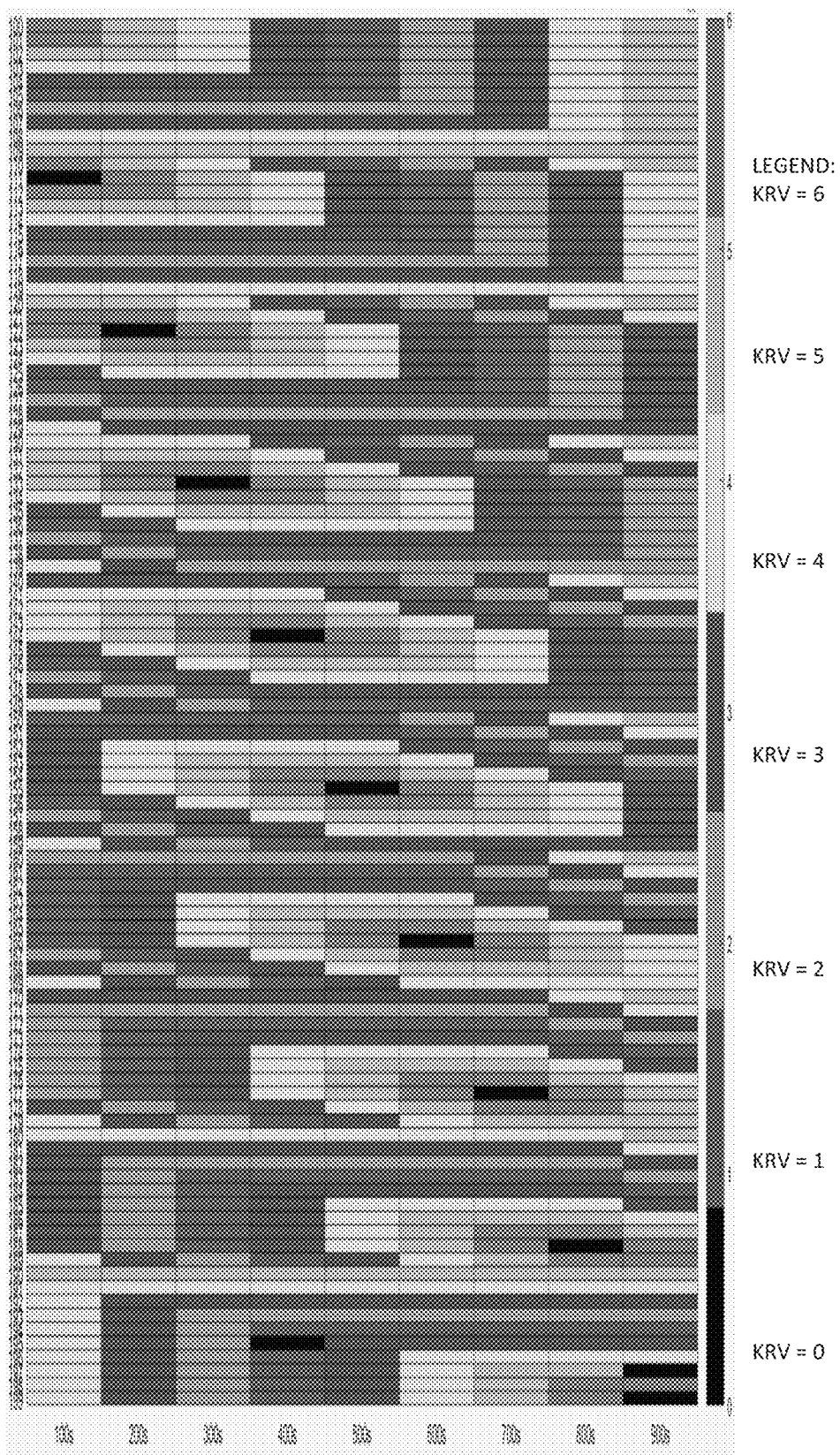
FIG. 2A is a 2-dimensional map representing a Kaprekar Graph depicting the Kaprekar Routine Value for the numbers from 100 to 999. The first column represents the numbers from 100 at the top, to 199 at the bottom. The second column represents the numbers from 200 at the top, to 299 at the bottom, and so on. The color or shading of the cell corresponds to the KRV value.

The present invention may be implemented as a system, a method, and/or a computer program product. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language, Java, JavaScript, Matlab, or similar programming languages. The computer-readable program instructions may execute entirely on the user's computer, partly on the user's computer, as a stand-alone software package partly on the user's computer and partly on a remote computer, or entirely on the remote computer or server.

In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations of methods, apparatus (systems), and computer program products according to embodiments of the invention. It will be understood that each block of the flowchart illustrations, and combinations of blocks in the flowchart illustrations, can be implemented by computer-readable program instructions.

These computer-readable program instructions may be provided to a processor of a general purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart block or blocks.

The flowcharts in the Figures illustrate the architecture, functionality, and operation of possible implementations of systems, methods, and computer program products according to various embodiments of the present invention. In this regard, each block in the flowchart may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the flowchart illustrations, and combinations of blocks in the flowchart illustrations, can be implemented by special-purpose hardware-based systems that perform the specified functions or acts or carry out combinations of special-purpose hardware and computer instructions.

The present invention employs results of the Kaprekar Process, also known as the Kaprekar Routine, as disclosed by D. R. Kaprekar in: "Another Solitaire Game." Scripta Mathematica 15 (1949):244-45. See FIG. 1 for a Java program that calculates the nodes of a Kaprekar Graph for 3-digit numbers, accompanied by a table of Kaprekar Routine Value (KRV) outputs.

The Kaprekar Routine is as follows: Start with a number having 3 digits, for example the number 103. Rearrange the digits of the number from highest to lowest. Also rearrange the digits from lowest to highest. Then, subtract the low-to-high from the high-to-low. This is one "round" or "iteration" of the process. Continue with rounds of the Kaprekar Routine until the result reaches 0 or a number that, when subjected to the Kaprekar Routine, returns itself. Such a 3-digit number is 495, a Kaprekar Constant.

Note: the "Kaprekar Constant" should not be confused with the idea of a "Kaprekar number," which is a different mathematical concept discovered by the same mathematician. See D. R. Kaprekar (1980-1981). "On Kaprekar numbers". *Journal of Recreational Mathematics.* 13: 81-82.

When the Kaprekar Routine is applied to the following 3-digit numbers, the result is immediately 0. These numbers, 111, 222, 333, 444, 555, 666, 777, 888, and 999, are called "epicenters."

FIG. 2A illustrates a 3-digit Kaprekar Graph, which is embodied as a data structure in machine-readable memory for use with the present invention. The graph contains 900 nodes, arranged in 100 rows by 9 columns. The nodes are connected by edges, and each node is connected directly to 2 to 4 other nodes. All of the nodes are connected indirectly. The edges connect the nodes to create a data structure that may be represented by a rectangular, two-dimensional map.

Each node in the graph is associated with two values. One value is a number between 100 and 999, called a "Numbertext Value". Each node has a distinct Numbertext Value, and no Numbertext Value is repeated. In preferred embodiments, the Numbertext Values are arranged in sequential order. In FIG. 2A, the first column represents nodes from Numbertext Value 100 at the top to 199 at the bottom. The second column represents nodes from 200 at the top, to 299 at the bottom, and so on. The ninth column represents nodes from 900 to 999.

The other value associated with each of the nodes is the Kaprekar Routine Value ("KRV"). This is the number of iterations of the Kaprekar Routine needed for the 3-digit number (the Numbertext Value) to reach the 3-digit Kaprekar Constant 495 or 0. This is shown in FIG. 2A by different degrees of shading (or color values), as referenced by the LEGEND to the right of the ninth column of numbers.

For example, to find the KRV of the 3-digit number 103, perform the following steps:
Iteration 1: 310−013=297
Iteration 2: 972−279=693
Iteration 3: 963−369=594
Iteration 4: 954−459=495
Here, the Kaprekar Constant 495 is reached after four iterations of the Kaprekar Routine, so the KRV of the number 103 is 4.

In accordance with the invention, the range of numbers intended to be used to represent the various characters that are to be encoded as Numbertext is chosen by the designer of an encryption system of the present invention. A data structure representing the Kaprekar Graph that includes that range of numbers is created in a computer-readable, data storage medium. In preferred embodiments, each node is a data object containing the Numbertext Value, appropriate pointers to adjacent node data objects and/or one or more epicenters, and optionally the KRV.

A data structure representing the Kaprekar Graph is used to transform certain numbertext into the Ciphertext of the present invention. Each of the 3-digit numbers in the numbertext is converted into a Kaprekar Cryptogram. Specifically, each is converted into a direction and distance between (a) the node associated with the 3-digit number and (b) an epicenter on the Kaprekar Graph. The direction and distance are expressed as orthogonal vectors, e.g. Left and Down.

For instance, as shown in FIGS. 2A and 2B, see node 320. Here the Numbertext Value is 320. Node 320 is directly connected to the nodes with Numbertext Values 319 (not shown in FIG. 2B), 321, 220, and 420. Node 320 also is associated with the number 4, which is the KRV for 320. (This is illustrated in FIG. 2A by shading.)

A pair of vectors connect node 320 to an epicenter, node 222. The first vector A1 points one node to the left, to the node which has a Numbertext Value of 220. A second vector A2 extends downward from node 220 to the node which has a Numbertext Value of 222. Node 222 is an epicenter node, namely a node that has a KRV of 0.

The direction and length of these vectors is part of the Kaprekar Cryptogram for Numbertext Value 320. Additionally, the epicenter used would be represented in the Kaprekar Cryptogram. For 320, the Kaprekar Cryptogram could be, for example K2L1D2. Here, the first element, K2, encodes the epicenter used, here node 222, represented by 2. The second element, L1, encodes the epicenter being one column to the left of the node with Numbertext Value 320, and the third element, D2, encodes the epicenter being two rows down from the aforesaid node 320. These are referred to as encoded directions on the Kaprekar Graph.

An alternative form of Kaprekar Cryptogram would include the KRV that corresponds to the Numbertext Value, providing redundancy to be used as a cryptographic primitive for data integrity confirmation, as if it were a checksum or parity bit. In this example, the alternative version of Kaprekar Cryptogram for 320 could be 4K2L1D2. Here, the first element, namely the value 4, is the KRV, and the second element, K2, encodes the epicenter used. The third element, L1, encodes the epicenter being one column to the left of the node with Numbertext Value 320, and the fourth element, D2, encodes the epicenter being two rows down from the aforesaid node 320. Those skilled in the art will realize that in further alternative embodiments of the invention, a Kaprekar Cryptogram could present its elements in reverse or alternative order and using other characters to define such vectors.

In preferred embodiments of the invention, a single node may be represented by more than one Kaprekar Cryptogram. For the example of node 320, an alternative Kaprekar Cryptogram would be derived from the position of the node on the Kaprekar Graph relative to a different epicenter, such as node 333, as also shown by the vector B in FIG. 2B. The corresponding Ciphertext would be derived from K3 (the epicenter 333), L0 encoding that the epicenter is in the same column as the node with Numbertext Value 320, and D13 encoding that the epicenter is 13 rows down from the node. Thus an alternative Kaprekar Cryptogram for 320, as defined by the vector B, would be K3L0D13

By causing a single 3-digit number representing a particular character to be encoded with any of various Kaprekar Cryptograms within the Ciphertext for a particular message during a single encryption session, the user of this embodiment of the invention generates Ciphertext that isn't readily decoded from a knowledge of the relative frequency of letters in English-language text.

When performing a further encoding of Ciphertext in accordance with a Kaprekar$^2$ embodiment of the invention, the processor is programmed to generate cryptograms that are distinguishable from the Kaprekar Cryptograms generated from the 3-digit encodings for characters in the original Plaintext. For example, if the programming produces a Kaprekar Cryptogram that includes the character "K", each Kaprekar$^2$ Cryptogram could instead include the character "J" or a lower case "k" or any other designator selected by the designer of this implementation. Alternatively the Kaprekar$^2$ Cryptogram could be chosen to follow a different directional path from the corresponding Kaprekar Cryptograms in the Ciphertext, e.g. up and right rather than down and left.

Example of Kaprekar Encryption

If we encoded the letters A through J as the numbers 1 through 9 respectively, and used this scheme, the text "BAD EGG" would be "214 577". If we were to send this, the message could be easily decrypted. In accordance with our invention, we use the data structure of a Kaprekar Graph to hide the message.

The number 214 is close to the epicenter 111. Encode three-digit numbers based on proximity to the epicenters. A Kaprekar Cryptogram for 214 is K1L1U3: K1 (since the node 214 is being compared to the 111 epicenter) L1 U3 (one to the left, and 3 steps up to epicenter 111).

The Kaprekar Cryptogram for the text EGG (577) will be K7R2D0.

Therefore "BAD EGG" is encrypted with the cryptograms "K1L1U3-0-K7R2D0" (In the example here, the space character is represented by the string "-0-".)

To produce the Ciphertext in accordance with our invention, an encryption processor first takes in a message to be encrypted: the Plaintext. The processor parses the Plaintext into individual characters or short strings of characters. The processor sends queries to look up the numerical values of the characters or strings, to a computer memory, which may, for example, be a solid state memory, a magnetic or optical disk drive, or a memory element at a remote location such as a database or cloud server. In return, the processor receives the numerical values.

Figure 3A:
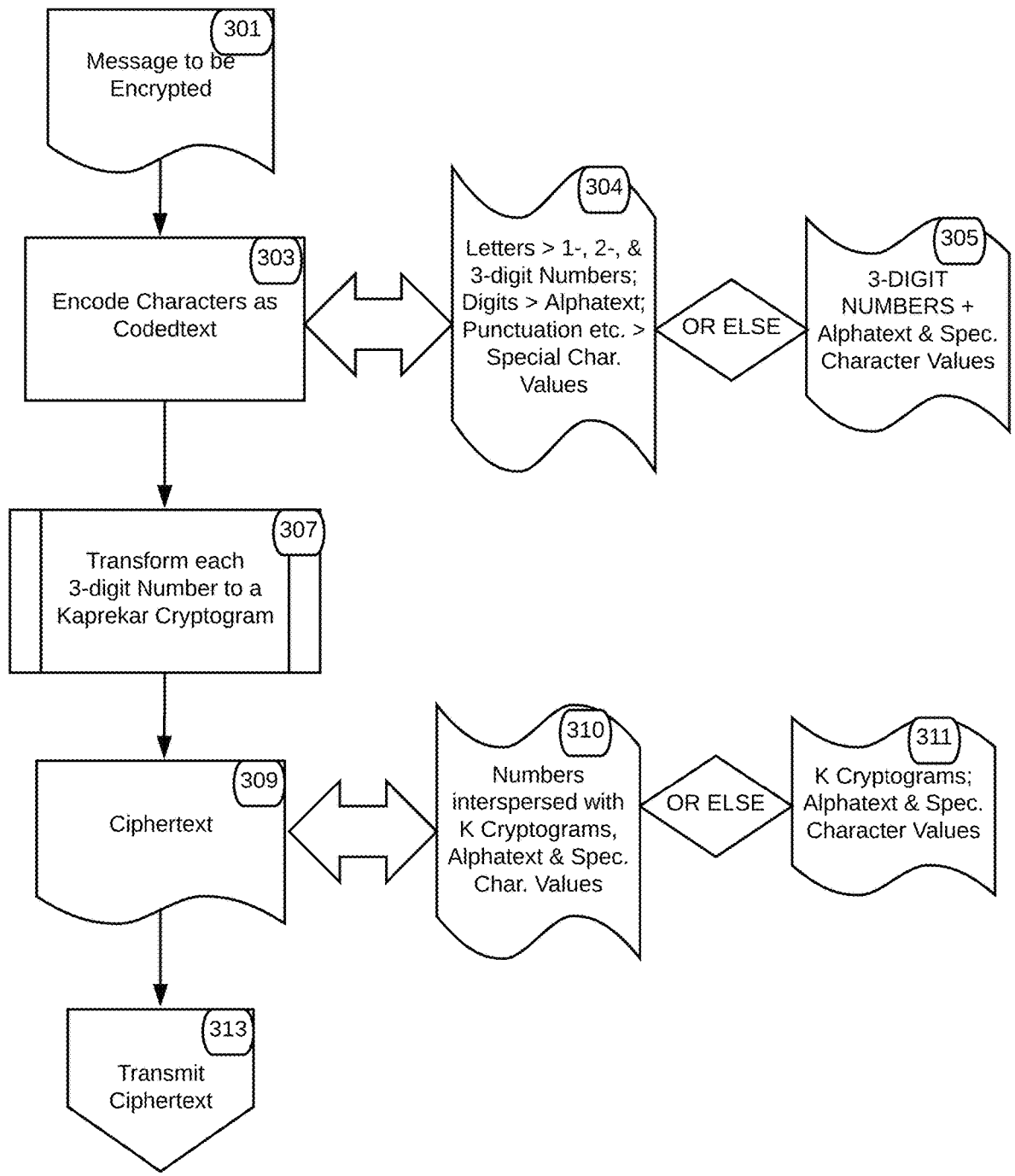
FIG. 3A illustrates an overview flowchart of alternative methods of encrypting a message, using a Kaprekar Cryptogram for either some of the characters or for each character of Plaintext.

In one embodiment of the invention, as shown in step 305 of FIG. 3A, each character in a message is first encoded as a 3-digit number, and a 3-digit Kaprekar Graph is then used for encrypting each character as a Kaprekar Cryptogram.

In some embodiments, a blank space in the message text may be represented by an arbitrary encoding in Ciphertext, such as the string: -0-

In a further embodiment, some of the characters in the Plaintext message input are encoded as a single binary-coded-decimal digit or as two such digits, as shown in FIG. 4. When such characters are encountered, the processor inserts the numerical value (expressed in base 10) into a memory buffer, and no further processing is performed. Thereby, the cryptogram presented in Ciphertext for such characters is simply the numerical cryptogram obtained from the encoding table of FIG. 4.

For each character that is represented by a 3-digit number, the processor obtains an alphanumeric string derived from memory structure embodying the Kaprekar Graph as described above, and inserts the resulting Kaprekar Cryptogram into the memory buffer for Ciphertext. Thus the Plaintext message will have been encrypted into Ciphertext in accordance with this embodiment of the present invention.

The contents of the Ciphertext memory buffer may then be transmitted in step 313 of FIG. 3A in the clear to one or more intended recipients by conventional means such as email, text messaging, Morse code transmitted by radio, semaphore, etc. For an example of a communication scheme where a token representing a particular coding table for use in decryption is transmitted to a recipient, see U.S. Pat. No. 10,356,058 B2.

Figure 3B:
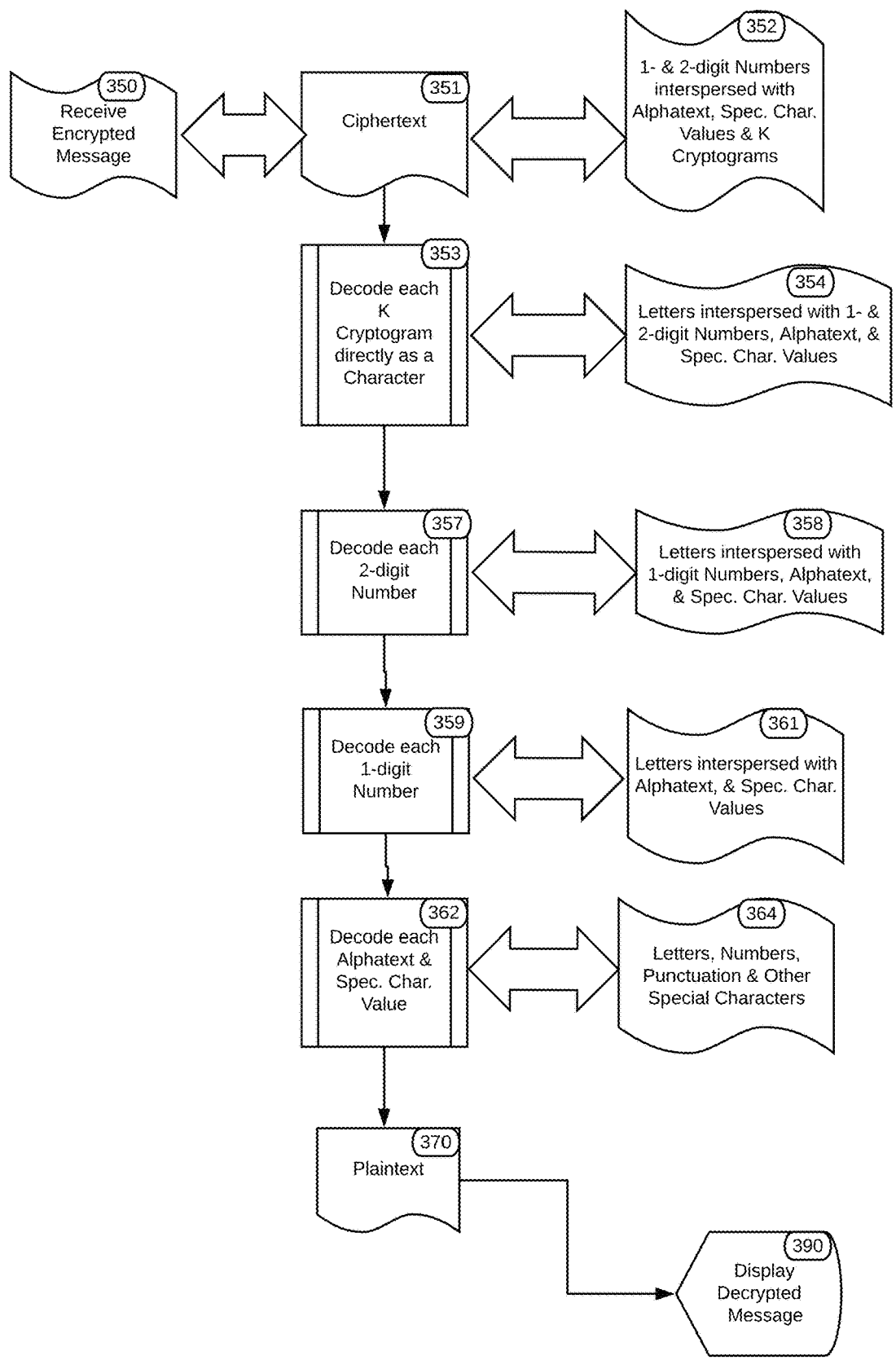
FIG. 3B illustrates an overview flowchart of a method of decrypting Ciphertext produced by each of the methods shown in FIG. 3A.

The recipient of such a message 350 will enter it as an alphanumeric string into a computer memory accessible by a processor having programming instructions for decrypting the message, as shown in FIG. 3B. In this embodiment, the processor will examine the first few characters in the incoming string to determine whether or not the first character of text has been rendered as a Kaprekar Cryptogram. If so, then an identifying character, here for example the character K, will be found, and the processor, following programmed instructions, will proceed to parse this portion of the incoming string to confirm that it is consistent with the pattern for a Kaprekar Cryptogram. For example, where a Kaprekar Cryptogram for a character encoded in accordance with FIG. 3A follows the pattern "Kn$_1$Ln$_2$Dn$_3$", where n$_1$, n$_2$, and n$_3$ are each a 1-digit or 2-digit number expressed in base 10, the processor will confirm that such a string is a Kaprekar Cryptogram. (The reader will understand that, in accordance with our invention, a Kaprekar Cryptogram may be encoded via any pattern that represents an epicenter on the Kaprekar Graph and a pair of coordinates derived from orthogonal vectors. The decryption processor would be programmed to recognize such a pattern accordingly.)

Following programmed instructions, the decryption processor will thereupon decrypt the first character of the message via the Kaprekar Graph stored in memory. It is a feature of our invention that the representation in memory of the Kaprekar Graph for decryption purposes may omit a numerical value for the nodes relating to the Kaprekar Cryptograms but rather would include a direct translation to the original character. Thus the Kaprekar Graph in memory of the decryption system is preferably designed to perform in a single step the outputting of a decrypted character in Plaintext, referred to in step 353 of FIG. 3B. That is, instead of outputting a 3-digit number string, the memory structure interacting for decryption with the decryption processor would have been programmed to incorporate a decoding scheme such as the table of FIG. 4 into a modification of the Kaprekar Graph of FIG. 2A and thereby produce Plaintext directly.

The decrypted character may be an alphabetic letter (or, if all possible characters are represented in the coding table by a 3-digit number, then the decrypted character may be an alphanumeric or special character).

FIG. 3A illustrates an overview flowchart of an encryption method in accordance with an embodiment of the present invention. The first method is performed as follows:

Step 301: input Plaintext string of characters defining a message to be encrypted Step 303: encode each Plaintext character in the message. In this example, using the table of FIG. 4, each letter would be encoded as a number. Each number in the message would be encoded as a letter, optionally flanked by special character(s), which we call Alphatext. In this particular example, each special character in the message would remain as it originally appears in the message. More generally, a special character may be encoded as what we call a Special Character Value. The operations of step 303 produce a string of characters that we will call Codedtext.

In this example, the Numbertext Values for the alphabetic letters are assigned in the range of 1 to 999, in accordance with the principles of letter-proximity-based mapping referred to above. As described in step 304, an encoding table such as FIG. 4 produces a string of 1-digit, 2-digit, and 3-digit numbers as Numbertext, along with any Alphatext assigned to numerals and Special Character Values assigned to punctuation and other non-alphanumeric characters. In item 304, a recitation appears as "Letters >1-, 2-, & 3-digit Numbers" where the > symbol means "are encoded as".

Alternatively, as described in item 305, a different encoding table may encode each encodable input character as a 3-digit number, producing a string consisting of 3-digit numbers, along with any Alphatext and Special Character Values.

Step 307: convert each 3-digit number in the Codedtext string to encoded directions on a Kaprekar Graph, producing Ciphertext.

As described in item 310, the Ciphertext is a string of numbers, Alphatext and Special Character Values interspersed with Kaprekar Cryptograms Alternatively, as described in item 311, the Ciphertext may consist only of Kaprekar Cryptograms as well as any Alphatext and Special Character Values.

Step 313: transmit Ciphertext to recipient, by directing it to a communication channel which the recipient can access.

FIG. 3B illustrates an overview flowchart of a method of decrypting Ciphertext that was produced by a method shown in FIG. 3A.

Step 350: recipient system receives the Ciphertext 351 as a string of 1-digit and 2-digit numbers interspersed with Kaprekar Cryptograms as well as any Alphatext and Special Character Values 352 and proceeds to decrypt as follows:

Use a decryption processor to perform step 353. Such a decryption processor would be programmed to decode each Kaprekar Cryptogram directly as a character without producing a 3-digit number. As shown in item 354, the resulting string of characters contains letters, i.e. alphabetic characters, interspersed with 1-digit numbers, 2-digit numbers, and any Alphatext and Special Character Values that were present in the Ciphertext 351. Use a decryption processor to decode each 2-digit number in the string, as shown in step 357, producing, as described in item 358, a modified string of letters interspersed with 1-digit numbers and any Alphatext and Special Character Values that were present in the Ciphertext 351.

Perform step 359 by decoding each 1-digit number in the string, producing 361 a further modified string of letters interspersed with any Alphatext and Special Character Values that were present in the Ciphertext 351.

Perform step 362 by decoding each Alphatext and Special Character Value using a table in pertinent computer memory such as is exemplified in FIG. 4. This step produces 364 a string of letters, along with any numbers and punctuation or other special characters that were represented in the Ciphertext 351.

The product of step 362, as described in item 364, is decrypted Plaintext 370, which is then displayed to the recipient 390. Such display might be on a screen, printed on paper, or transmitted electronically by text messaging or email, or any other means of displaying or outputting a message.

FIG. 4 is an example of a table showing conversion of letters of Plaintext to numerical cryptograms, some having 1, others having 2, and still others having 3 digits. It was produced by taking into account the adjacency of letters in typical English-language text, referred to herein as letter-proximity-based mapping. This embodiment results in shorter message length for the Ciphertext (compared to the use of 3-digit strings transformed into Kaprekar Cryptograms for each of the characters) and thereby facilitates efficient use of communication channels.

The numerical values of the letters in this FIG. 4 are selected to avoid ambiguity or confusion in values for characters that typically are adjacent in words in English. For example, consider the rudimentary cipher that converts A to 1, B to 2, . . . and Z to 26. In that conversion, if the numbertext is transmitted simply as a string of digits, the representations for 'AB' and 'L' would be identical, as both of them would be rendered as the character string "12". The decryption system would not be able to distinguish between, say, "abate" and "late" without further, clock-expensive analysis. To avoid this dilemma, we devised the following rules:

1) It is known that in typical English-language text, letter combinations BQ, CV, CJ, FZ, GQ, JQ, JV, JX, KQ, PQ, XZ, VP don't occur together in either direction. Hence the letters from these combinations that don't occur together can be assigned cryptograms consisting of 1-digit numbers. Based on this method, B, Q, C, V, J, F, Z, G, X, K and P are suitable for being assigned 1-digit numbers. However, since in base 10 representation there are only 9 single-digit numbers (excluding 0), we selected the more frequently occurring letters B, Q, C, V, J, F, G, K, P for being assigned 1-digit numbers and omitted Z and X from this list since it is advantageous to assign small-digit numbers to letters used more frequently to minimize message length. As will be seen in step 4) below, X and Z are among the least frequently used letters in English. The order in which numbers 1 through 9 are assigned as cryptograms for the letters B, Q, C, V, J, F, G, K, P does not impact the method described here. FIG. 4 shows one example of such an assignment. This embodiment of the invention may be implemented by any other order of assignment of single-digit numbers to the letters B, Q, C, V, J, F, G, K, P, X, Z.

2) Assign 2-digit or 3-digit numbers to the rest of the alphabet with the following conditions for 2-digit number assignments:
   a. The allowed combinations of 2-digit numbers become the numbers that would represent the letter combinations BQ, CV, CJ, GQ, JQ, JV, KQ, PQ, VP where the 1-digit cryptograms corresponding to the letters in the above combination are from step 1) above. This virtually eliminates ambiguity in the interpretation of what letters the 2-digit numbers correspond to, since they are formed by combinations of numerals that correspond to letters that do not occur together in normal text.
   In addition to the above, the fact that the letter Q is almost always followed by the letter U (with the exception of words adopted from other languages) can be used to generate additional allowed 2-digit numerical cryptograms corresponding to individual characters in the original Plaintext. These would be formed by using the numerical cryptogram that encodes Q along with other numbers. For the exceptions regarding letters other than U that follow Q, since Q is not followed by the letters which are assigned 1-digit numerical cryptograms, additional 2-digit strings would accordingly be allowable for assignment as such numerical cryptograms.
   b. The additional constraint in assigning two-digit numbers to letters is: don't use numbers where the second digit of the numerical cryptogram representing a given encoded letter is the same as the first digit of the cryptogram for another encoded letter. For example, using 18 as the numerical cryptogram for a first letter and 87 for another letter would result in ambiguity, since in the character string 187, it is unclear whether to decrypt it as representing 1 and 87 or 18 and 7, or the 3-digit number 187. Therefore, although from paragraph 2)a. above, using the assignments from FIG. 4 for letters B, Q, C, V, J, F, G, K and P (1, 8, 2, 9, 5, 3, 4, 6 and 7 respectively) and the considerations regarding letter Q as discussed above in 2)a. yield the character strings 18, 29, 25, 48, 58, 59, 68, 78 and 97 corresponding to BQ, CV, CJ, GQ, JQ, JV, KQ, PQ, VP respectively, and character strings 81, 82, 83, 84, 85, 86, 87 and 89 corresponding to Q and adjacent letters that don't occur next to Q, the number of possible 2-digit strings as numerical cryptograms for alphanumeric characters are seen to decline further. For example, if 25 is selected as a 2-digit encoding, the 2-digit numbers 58 and 59 are eliminated as possible encoded values.

3) Three-digit numerical cryptograms are assigned to remaining letters after available 2-digit assignments are exhausted. The utilization of 1-digit, 2-digit and 3-digit numbers as cryptograms for encoding letters (rather than using only 3-digit numbers to encode all letters, as described in item 305 of FIG. 3A) reduces file size dale resulting Ciphertext and thus is a technological advantage of this feature.

In addition, the non-uniform length of Ciphertext for the encryption of each letter adds additional robustness to encryption strength. This is because the encryption scheme is thereby less predictable, making it more challenging for an adversary to decrypt.

As an example, if all letters have the same number of digits assigned to them for encryption, it might be relatively simple to eventually figure out that the smallest string of characters in an encrypted word are A or I since these are standalone characters that are also complete words. However, if these letters are assigned. 3-digit numbers, then it becomes more challenging for an adversary to decrypt. For example, in FIG. 4, the numerical cryptograms assigned to letters A, B, C, O, P, Y are 180, 1, 2, 680, 7, 83 respectively. Hence (where a space between words is represented by -0-), the first-level Ciphertext for the words "BY A COP" would be "183-0-180-0-26807". In this example the length of the cryptograms representing BY and A are the same, hence rudimentary attempts to decrypt the letter A or I from shortest number strings between word delimiters (representing spaces) will not be as successful. This illustrates the situation where the non-uniform length of numerical cryptograms adds additional robustness to encryption strength.

Figure 5A:
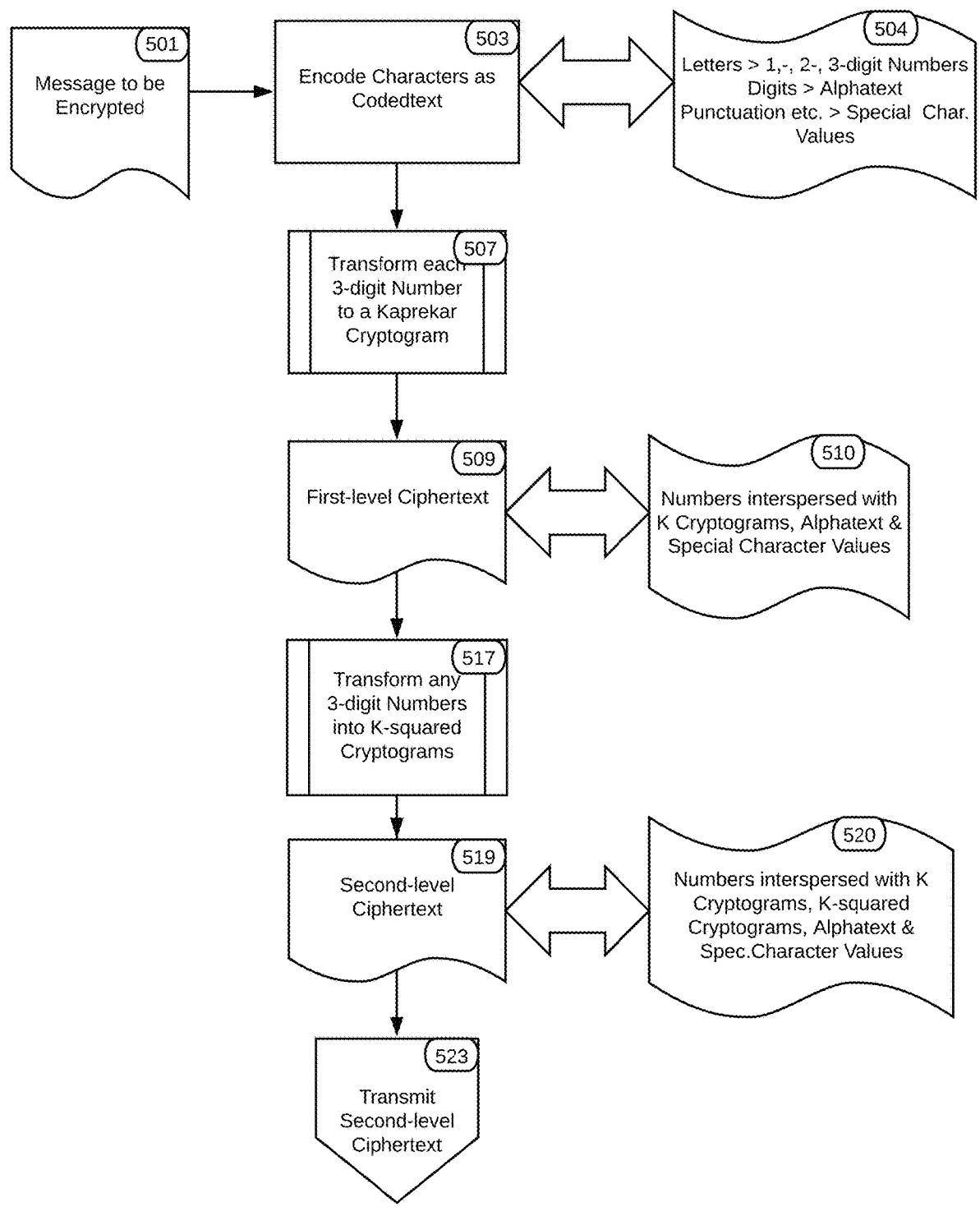
FIG. 5A illustrates an overview flowchart of a Kaprekar$^2$ (that is, Kaprekar-squared, or second-level Kaprekar) encryption method in accordance with the present invention.

FIG. 5A is an overview flowchart of Kaprekar$^2$ (that is, Kaprekar-squared, or second-level Kaprekar) encryption methods in accordance with the present invention.

Input Plaintext string of characters 501 defining a message to be encrypted

Step 503: Using a coding table such as the one exemplified in FIG. 4, encode each Plaintext letter as a 1-digit number, 2-digit number, or 3-digit number. Encode numerical digits from Plaintext as Alphatext, and encode punctuation and other non-alphanumerical characters with Special Character Values. This produces Codetext described in item 504. In item 504, a recitation appears as "Letters >1-, 2-, & 3-digit Numbers" where the > symbol means "are encoded as".

For the characters encoded as 3-digit numbers, transform them to first-level Kaprekar Cryptograms shown as step 507, producing a string of binary-coded decimal characters that we will call first-level Ciphertext 509, a string of numbers interspersed with Kaprekar Cryptograms 510. Numerical digits and special characters are encoded as non-numeric values. Alternatively, each of the characters in a message may be encoded as a 3-digit number and then encoded as first-level Kaprekar Cryptograms as well.

Step 517: parsing the string of first-level Ciphertext, for each 3-digit number found therein that is made up of 1-digit or 2-digit numbers derived from 2 or more Plaintext alphabetic characters, the encryption processor proceeds to convert the 3-digit numbertext string to encoded directions on the Kaprekar Graph, creating second-level Kaprekar Cryptograms 519 in the output string 517 (such second-level cryptograms having representations that are distinguishable from any of the first-level cryptograms), thereby encrypting the message as second-level Ciphertext 520. Such second-level Ciphertext would include any or all of the following elements: numbers interspersed with Kaprekar Cryptograms, Kaprekar-squared Cryptograms, Alphatext and Special Character Values.

Step 523: transmit second-level Ciphertext to a communication channel accessible by an intended recipient This embodiment implements a double use of Kaprekar Cryptograms. The first use was to encrypt each character that's represented in the coding table by a 3-digit number. But as some of the characters are encoded as 1-digit or 2-digit numbers, it is to be understood that when the intermediate string of characters we call first-level Ciphertext is generated, it will contain substrings that inherently can be parsed as three-digit numbers. It is to such 3-digit numbers that this embodiment of our invention is designed to provide another layer of encryption, by assigning to such numbers their own (second-level) Kaprekar Cryptograms. Such Kaprekar$^2$ Cryptograms are encoded to be distinguishable by the encryption processor from the first-level Kaprekar Cryptograms. Thus the first step of decrypting Second-level Ciphertext is for the decryption processor to decode each second-level Kaprekar Cryptogram into its corresponding 3-digit number, as described below.

Figure 5B:
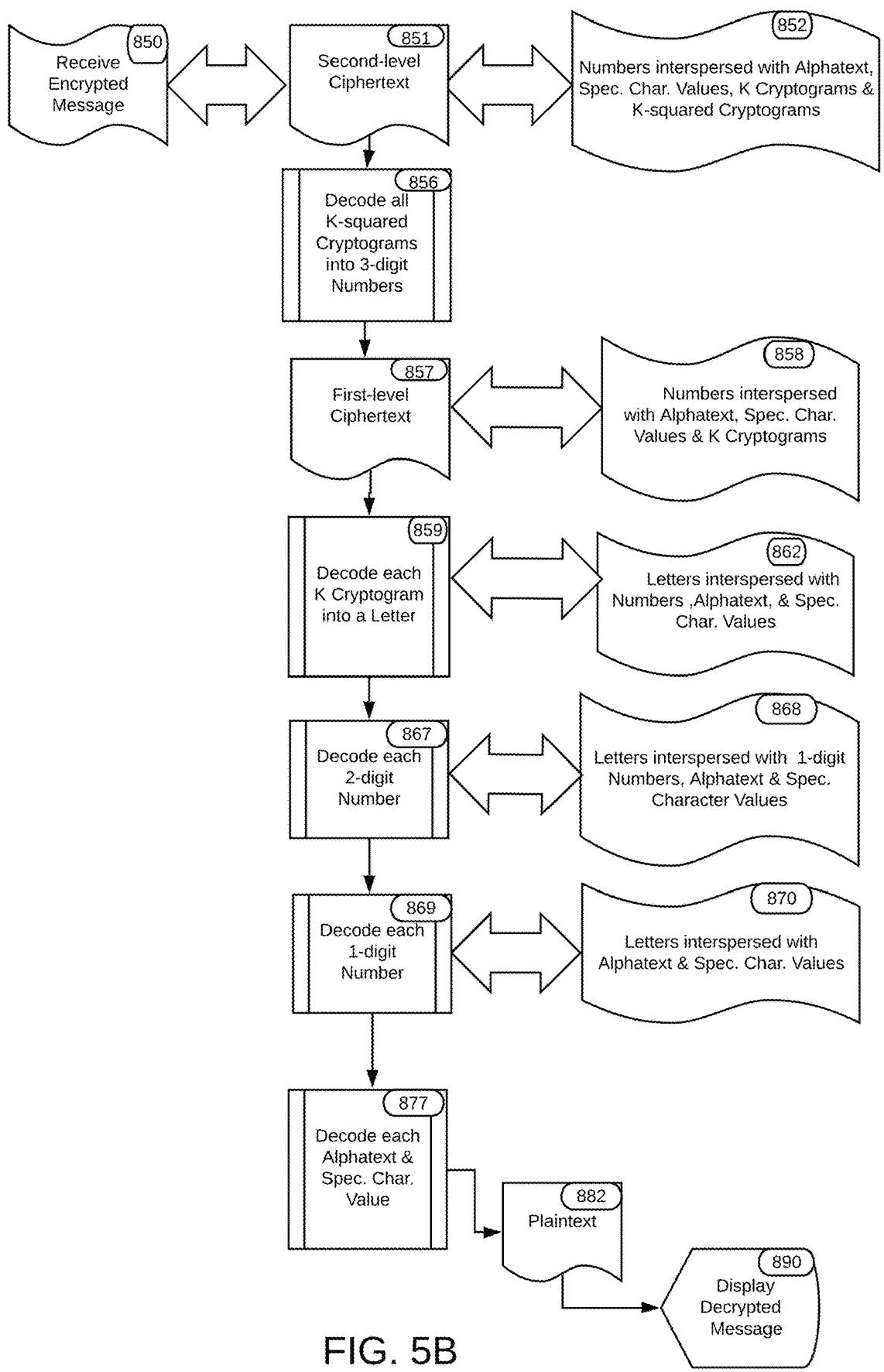
FIG. 5B illustrates an overview flowchart of a method of decrypting Kaprekar$^2$ (that is second-level Kaprekar) Ciphertext produced by the method shown in FIG. 5A.

For this "unwrapping" process, see FIG. 5B, which is an overview flowchart of Kaprekar$^2$ (that is, Kaprekar-squared, or second-level Kaprekar) decryption methods for the Second-level Ciphertext produced in accordance with FIG. 5A Step 850: recipient system receives the second-level Ciphertext 851 consisting of numbers interspersed with Kaprekar Cryptograms and Kaprekar-squared Cryptograms, as well as Alphatext representing one or more digits and any Special Character Values 852 and proceeds to decrypt as follows:

Step 856: parsing the string of second-level Ciphertext, a decryption processor converts each second-level Kaprekar Cryptogram to a 3-digit number, producing first-level Ciphertext 857 which includes 1-digit and 2-digit coded representations of characters interspersed with first-level Kaprekar Cryptograms, as well as any Alphatext and Special Character Values 863.

Step 859: Decode each Kaprekar Cryptogram in first-level Ciphertext directly as a character, similarly to the aforesaid step 353 of FIG. 3B. This produces an intermediate string 862, consisting of some decoded characters (typically letters) interspersed with 1-digit and 2-digit numbers and any Alphatext and Special Character Values.

Thereafter proceed to parse the string described in item 862 and decode each 2-digit number in step 867, producing a second-stage intermediate string of characters, followed by decoding each 1-digit number in step 869, producing a third-stage intermediate string containing letters interspersed with any Alphatext and Special Character Values 870.

The decryption processor then proceeds to decode (see item 877) each Alphatext and Special Character Values in the string 870, producing Plaintext 882, which is displayed to the recipient 890 by any of various means as aforesaid with respect to item 390 in FIG. 3B FIG. 6A presents an example of Matlab code for encrypting a message in accordance with this embodiment of the invention.

FIG. 6B presents an example of Matlab code for decrypting a message encrypted in accordance the code of FIG. 6A.

FIGS. 7A and 7B present the results of encrypting the sample text shown in FIG. 7A with the Matlab code of FIG. 6A, which produced the first-level encryption string shown in FIG. 7A and the second-level encryption string shown in FIG. 7B. The decrypted result is also shown in FIG. 7B.

The robust encryption method using unique proximity encoding combined with the geometric patterns of numbers on a Kaprekar Constant-map was tested for its strength using the online decryption tool set "Code Beautify." Code Beautify contains 17 decoding algorithms, including: Arcfour, Blowfish, Cast, Des, Goat, Loki, Rc, Rijndael, Saferplus, Serpent, Tripledes, Twofish, and Xtea. All algorithms failed to even remotely translate the encrypted code. Most did not even get a single character right.

Various alternatives and modifications can be made to the embodiments described above. For example, the Kaprekar Graph may be derived from the 4-digit Kaprekar Constant 6174. See: D. R. Kaprekar, "An Interesting Property of the Number 6174." *Scripta Math.* 15, 244-245, 1955. and D. Deutsch and B. Goldman, "Kaprekar's Constant." *Math. Teacher* 98, 234-242, 2004. Also, number systems other than base 10 may be employed. See: Byron L. Walden, "Searching for Kaprekar's Constants: Algorithms and Results." *Int'l J. of Mathematics & Mathematical Sciences* 2005:18 (2005) 2999-3004 DOI:10.1155/IJMMS.2005.2999.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Having thus described the invention, what we desire to claim and thereby protect by Letter Patent are:

1. A computer-implemented method for encrypting a message consisting of a string of characters comprising:
   providing in a first computer-readable medium a table addressable by an encryption processor, the table including:
      representations for a multiplicity of characters that would be contained in an English-language message,
         each alphabetic character being associated with a unique numbertext value,
         each numeric character being associated with a unique alphatext value comprising (a) an alphabetic character without a numeric representation or (b) a 3-digit number;
         each special character being associated with a unique special-character value that does not include any of said unique numbertext values or any of said unique alphatext values; and
   providing in a second computer-readable medium a data structure addressable by the encryption processor, the data structure representing a Kaprekar Graph having a multiplicity of nodes, each node being associated with a representation of:
      a numbertext value expressed in 3 digits, and
      at least one pointer to an epicenter node of the Kaprekar Graph;
   the data structure being adapted to return a Kaprekar Cryptogram when queried by the encryption processor; and then
   receiving into a memory structure addressable by the encryption processor a plaintext string of characters for encryption;
   parsing the plaintext string in the memory structure addressed by the encryption processor into individual alphanumeric and special characters;
   transmitting a query from the encryption processor to said first computer-readable medium for each of the unique encoded values for each of the individual alphanumeric and special characters;
   receiving each of the unique encoded values for each of the individual alphanumeric and special characters and assembling a string therefrom in the order in which the characters appear in the plaintext string;

upon receiving for a character a unique encoded value that is a 3-digit number, the encryption processor transmitting a query to said second computer-readable medium for a Kaprekar Cryptogram for each character in the plaintext string that corresponds to a node associated with a 3-digit encoded value in the data structure, wherein each Kaprekar Cryptogram includes a representation of orthogonal vectors defining the directions and distances on a Kaprekar Graph between the 3-digit encoded value and an identified epicenter;

the encryption processor substituting into said string a Kaprekar Cryptogram for each character in the original plaintext string that is associated with a 3-digit encoded value, thereby assembling a ciphertext string; and then outputting the ciphertext string so assembled to a channel of communication with an intended recipient of the ciphertext.

2. The method of claim 1, wherein the unique numbertext value for each alphabetic character in the table is from 100 to 999.

3. The method of claim 1, wherein the unique numbertext value for some of the characters in the table is from 1 to 99, such numbertext values having been assigned to characters representing English-language letters via letter-proximity-based mapping.

4. The method of claim 1, wherein different epicenters of the Kaprekar Graph are used during a single encryption session to produce different Kaprekar Cryptograms encoding a given character within the text, thereby obviating decryption based on letter frequency in English language text.

5. The method of claim 1, wherein each Kaprekar Cryptogram further includes a Kaprekar Routine Value, and serves as a cryptographic primitive that may be used for integrity checking.

6. A computer-implemented method for decrypting a ciphertext message encrypted by the method of claim 1, comprising:

providing in a computer-readable medium a data structure representing a Kaprekar Graph having a multiplicity of nodes, each node being associated with a representation of:
a numbertext value expressed in 3 digits, and
at least one pointer to an epicenter node of the Kaprekar Graph;
the data structure being adapted to return a decryption value when addressed by a decryption processor programmed to evaluate a Kaprekar Cryptogram by querying the computer-readable medium containing the data structure representing a Kaprekar Graph;
providing in another computer-readable medium a table addressable by the decryption processor, the table including a representation for each character to be decrypted, associated with a unique numbertext or alphatext or special-character value for each such character;
and then
receiving via a communication channel from a sender of ciphertext into a memory structure addressable by the decryption processor a ciphertext string that has been encrypted by the method of claim 1;
parsing the received ciphertext string by the decryption processor into individual Kaprekar Cryptograms and any numbertext, alphatext and special-character values not part of a Kaprekar Cryptogram;
transmitting from the decryption processor a series of queries to said computer-readable medium for a decryption value in the data structure that corresponds to each of the individual Kaprekar Cryptograms;
the decryption processor generating a multi-character string by substituting for each Kaprekar Cryptogram in the ciphertext string the decryption value returned from the computer-readable medium with the Kaprekar Graph data structure;
the decryption processor then parsing the multi-character string and generating therefrom a series of queries to said another computer-readable medium for the alphanumeric and special characters corresponding to the unique values in the order the characters were presented in the plaintext;
the decryption processor assembling a string of alphanumeric and special characters representing a decrypted version of the ciphertext message; and
displaying the decrypted version of the message.

7. The method of claim 6, wherein, in said data structure representing a Kaprekar Graph having a multiplicity of nodes, each node is also associated with a representation of a character, and
a decryption value returned from the computer-readable medium with the Kaprekar Graph data structure is the alphanumeric or special character corresponding to the Kaprekar Cryptogram.

8. The method of claim 6, wherein a decryption value returned from the computer-readable medium with the Kaprekar Graph data structure is a 3-digit numbertext string.

9. A computer-implemented method for decrypting a ciphertext message encrypted by the method of claim 3, comprising:

providing in a computer-readable medium a data structure representing a Kaprekar Graph having a multiplicity of nodes, each node being associated with a representation of:
a numbertext value expressed in 3 digits,
a character selected from the group consisting of alphanumeric characters and special characters, and
at least one pointer to an epicenter node of the Kaprekar Graph;
the data structure being adapted to return a decryption value when addressed by a decryption processor programmed to evaluate a Kaprekar Cryptogram by querying the computer-readable medium containing the data structure representing a Kaprekar Graph;
providing in another computer-readable medium a table addressable by the decryption processor, the table including a representation for each alphanumeric and special character to be decrypted, associated with a unique value for each alphanumeric and each special character, wherein 1-digit and 2-digit numbertext values have been assigned to characters representing English-language letters via letter-proximity-based mapping;
and then
receiving via a communication channel from a sender of ciphertext into a memory structure addressable by the decryption processor, a ciphertext string that has been encrypted by the method of claim 3;
the decryption processor parsing the received ciphertext string to detect by their patterns each individual Kaprekar Cryptogram present therein;
the decryption processor transmitting a series of queries to said computer-readable medium for a decryption value in the data structure that corresponds to each of the individual Kaprekar Cryptograms;

the decryption processor generating a multi-character string by substituting for each of the individual Kaprekar Cryptograms the decryption value returned from the computer-readable medium with the Kaprekar Graph data structure, said decryption value being an alphanumeric or special character;

the decryption processor parsing the modified ciphertext string and substituting for any 2-digit numbertext values present in said table in said another computer-readable medium the corresponding character producing a twice-modified ciphertext string; and then the decryption processor parsing the twice-modified ciphertext string and substituting for any 1-digit numbertext values present in said table in said another computer-readable medium the corresponding character producing a twice-modified ciphertext string; and then the decryption processor thereupon assembling a string of alphanumeric characters representing a decrypted version of the ciphertext message; and displaying the decrypted version of the message.

10. A computer-implemented method for encrypting a message consisting of a string of characters comprising:

providing in a first computer-readable medium a table addressable by an encryption processor, the table including representations for each character, associated with a unique encoded value for each character;

providing in a second computer-readable medium a data structure addressable by a processor, the data structure representing a Kaprekar Graph having a multiplicity of nodes, each node being associated with a representation of:

a numbertext value expressed in 3 digits, and at least one pointer to an epicenter node of the Kaprekar Graph;

and then receiving into a memory structure addressable by the encryption processor a plaintext string of characters for encryption;

parsing the plaintext string in the memory structure addressed by the encryption processor into individual alphanumeric and special characters;

transmitting a query from the encryption processor to said first computer-readable medium for each of the unique encoded values for each of the individual alphanumeric and special characters;

receiving each of the unique encoded values for each of the individual alphanumeric and special characters and assembling a string therefrom in the order in which the characters appear in the plaintext string;

upon receiving for a character a unique encoded value that is a 3-digit number, the encryption processor transmitting a query to said second computer-readable medium for a Kaprekar Cryptogram for each character in the plaintext string that corresponds to a node associated with a 3-digit encoded value in the data structure, wherein each Kaprekar Cryptogram includes a representation of orthogonal vectors defining the directions and distances on a Kaprekar Graph between the 3-digit encoded value and an identified epicenter;

the encryption processor substituting into said string a Kaprekar Cryptogram for each character in the original plaintext string that is associated with a 3-digit encoded value, thereby assembling a first-level ciphertext string;

and then the encryption processor parsing the first-level ciphertext for any 3-digit numbers present therein; and then transmitting a series of queries to said second computer-readable medium for a second-level Kaprekar Cryptogram for each of the 3-digit numbers present in the first-level ciphertext;

the encryption processor assembling second-level ciphertext that includes a first-level Kaprekar Cryptogram for each character in the plaintext string that is associated with a 3-digit numbertext value and includes a second-level Kaprekar Cryptogram for each of the 3-digit numbers in the first-level ciphertext; and then outputting the second-level ciphertext string so assembled to a channel of communication with an intended recipient of the ciphertext.

11. The method of claim 10, wherein the unique encoded value for some of the characters in the table is from 1 to 99, such encoded values having been assigned to characters representing English-language letters via letter-proximity-based mapping.

12. The method of claim 10, wherein different epicenters of the Kaprekar Graph are used during a single encryption session to produce different first-level Kaprekar Cryptograms encoding a given character within the text, thereby obviating decryption based on letter frequency in English language text.

13. A computer-implemented method for decrypting a ciphertext message encrypted by the method of claim 10, comprising:

providing in a computer-readable medium a data structure representing a Kaprekar Graph having a multiplicity of nodes, each node being associated with a representation of:

a numbertext value expressed in 3 digits and a plaintext character, and at least one pointer to an epicenter node of the Kaprekar Graph;

providing in another computer-readable medium a table addressable by a decryption processor, the table including a plaintext representation for each character, associated with a unique encoded value for each character;

and then receiving into a decryption processor a second-level ciphertext string that has been encrypted by the method of claim 10;

the decryption processor parsing the ciphertext string into individual second-level Kaprekar Cryptograms and any additional characters not part of a second-level Kaprekar Cryptogram;

the decryption processor generating a first-level ciphertext string by substituting for each second-level Kaprekar Cryptogram in the second-level ciphertext string the 3-digit numbertext value returned from said computer-readable medium with the Kaprekar Graph data structure, producing a first-level ciphertext string which includes 1-digit and 2-digit coded representations of characters interspersed with first-level Kaprekar Cryptograms and any alphatext and special character values;

the decryption processor generating an intermediate string of characters by substituting for each first-level Kaprekar Cryptogram in the first-level ciphertext string the alphanumeric character returned from said computer-readable medium with the first-level Kaprekar Graph data structure, the decryption processor then parsing the intermediate string and converting each 2-digit number into its corresponding plaintext character, producing a second-stage intermediate string of characters;

the decryption processor then parsing the second-stage intermediate string and converting each 1-digit coded representation into its corresponding plaintext character producing a third-stage intermediate string of characters the decryption processor then parsing the third-stage intermediate string and decoding any alphatext and special character values present therein;

producing a plaintext string of characters representing a decrypted version of the ciphertext message; and displaying the decrypted version of the message.

\* \* \* \* \*